United States Patent Office.

CHARLES O. CHAPIN AND HENRY A. CHAPIN, OF SPRINGFIELD, MASS.

MANUFACTURE OF PAPER-PULP FROM STRAW, &c.

SPECIFICATION forming part of Letters Patent No. 227,676, dated May 18, 1880.

Application filed October 8, 1879.

*To all whom it may concern:*

Be it known that we, CHARLES O. CHAPIN and HENRY A. CHAPIN, both citizens of the United States, residing at Springfield, in the county of Hampden and State of Massachusetts, have invented certain new and useful Improvements in the Manufacture of Paper-Pulp from Straw and other Like Stalky or Reedy Fibrous Materials; and we do hereby declare that the following is a full, clear, and exact description of the invention, which will enable others skilled in the art to which it appertains to make and use the same.

Heretofore the processes employed in converting said fibrous materials into paper-pulp have consisted of what may be termed "wet processes"—that is to say, the said materials have been subjected to the action of various solutions containing chemical agents, or to the action of water, boiling or otherwise, or treated under various degrees of steam-pressure.

The above-named wet processes, owing to the refractory nature of the silicious glaze or coating common to straw and like stalky or reedy fibrous materials, are operated at the expense of much time and strong chemical solutions applied thereto under a high degree of steam-pressure.

The above-named severe treatment of said fibrous materials seems to be demanded by the natural resistance of the said silicious glaze to the disintegrating action of said heated chemical solutions, and to be practiced, also, for the purpose of freeing the said materials from said glaze and from the coloring properties thereof.

The object of our invention is to provide an improved process for so effectually destroying the said silicious glaze on the aforesaid fibrous materials, previous to submitting them to the action of any of the well-known wet processes, as to render the disintegration of the fibers much less difficult and expensive, and to destroy the coloring properties of said silicious glaze previous to treating said materials in disintegrating solutions.

In carrying our invention into effect we first submit the straw or other of said fibrous materials to the action of dry heat by baking them in any convenient apparatus or in an oven, one of the most effective ways being to inclose them in suitable metallic cylinders, which may be made to rotate in an oven or furnace, so as to cause said cylinders to be evenly heated over their whole surface, and also to cause the fibrous material contained therein to be properly agitated and the contents thereof to be brought in contact with or near to the interior surface of said cylinder, so that they may be uniformly baked.

The degree of heat which we have found to produce the best effect for destroying the silicious glaze or coating on said materials is between 450° and 500° Fahrenheit, and we find that an exposure of the said materials to the action of dry heat, as aforesaid, during the space of about fifteen minutes serves to so far destroy the said glaze or coating that said material can be easily reduced to pulp by subsequently boiling it in a weak solution of caustic lye—say of about 7° strength—for about ten minutes, and the disintegration of the fibers can be fully accomplished by afterward passing said boiled material between rollers or similar crushing appliances.

The pulp so produced may be washed and bleached by any of the well-known means employed for that purpose.

When an unusually strong-fibered pulp is required the materials may be exposed to a baking-heat not exceeding 450° Fahrenheit, when, by boiling them in a lye of the above-named strength for about one hour, disintegration may be accomplished by crushing, as before mentioned.

We find it preferable to cut the material into short lengths to prepare it for roasting or baking, as in that form the heat acts more uniformly upon it, and it is thus reduced to the most convenient state for boiling and subsequent treatment, as above set forth.

We are aware that it is old, in the manufacture of paper-pulp from wood, to distill wood by heat in its natural moisture for the purpose of freeing it from oils and acids, as shown in the patents of Carter, Nos. 215,880 and 219,556 and 219,557, and we do not claim this process as making any part of our invention.

What we claim as our invention is—

1. The hereinbefore-described improvement in the art of making paper-pulp from straw and other stalky or reedy fibrous materials, which consists in baking or roasting said materials, without moisture, previous to boiling them in chemical solutions or otherwise, for the purpose of disintegrating them.

2. The within-described method of destroying the silicious glaze existing upon the surface of straw and the like stalky or reedy fibrous materials—viz., by roasting or baking the same, without moisture, to prepare them for easy disintegration and manufacture into pulp, substantially as set forth.

C. O. CHAPIN.
     HENRY A. CHAPIN.

In presence of—
 GEO. LEONARD,
 N. A. LEONARD.